United States Patent [19]
Cullen

[11] Patent Number: 5,960,612
[45] Date of Patent: *Oct. 5, 1999

[54] DENSITY CONTROL MEANS FOR AN AGRICULTURAL FEED BAGGING MACHINE

[76] Inventor: Steven R. Cullen, P.O. Box 642, Astoria, Oreg. 97103

[ * ] Notice: This patent is subject to a terminal disclaimer.

[21] Appl. No.: 09/106,699

[22] Filed: Jun. 29, 1998

Related U.S. Application Data

[63] Continuation of application No. 08/342,603, Nov. 21, 1994, Pat. No. 5,894,713, which is a continuation of application No. 07/912,873, Jul. 13, 1992, abandoned.

[51] Int. Cl.⁶ .................. B65B 1/24; B65B 9/10; B65B 43/42
[52] U.S. Cl. .................. 53/436; 53/459; 53/527; 53/567; 53/576
[58] Field of Search .................. 53/284.7, 567, 53/570, 576; 100/43, 65, 100, 144, 148, 191; 141/114

[56] References Cited

U.S. PATENT DOCUMENTS

| | | | |
|---|---|---|---|
| 2,294,440 | 9/1942 | Barker | 100/100 |
| 2,552,888 | 5/1951 | Druetta | 100/100 |
| 2,646,913 | 10/1953 | Goldberg et al. | 226/45 |
| 2,781,619 | 2/1957 | Gardes | 53/13 |
| 3,065,842 | 11/1962 | Nowak | 198/128 |
| 3,192,865 | 7/1965 | Smith | 141/12 |
| 3,192,965 | 7/1965 | Smith | 141/12 |
| 3,222,853 | 12/1965 | Michael | 56/202 |
| 3,602,380 | 8/1971 | Spencer | 214/17 |
| 3,687,061 | 8/1972 | Eggenmuller et al. | 100/65 |
| 3,791,593 | 2/1974 | Griffin | 100/100 |
| 4,046,068 | 9/1977 | Eggenmuller et al. | 100/65 |
| 4,102,109 | 7/1978 | Modra et al. | 53/24 |
| 4,256,031 | 3/1981 | Ryan | 100/65 |
| 4,337,805 | 7/1982 | Johnson et al. | 141/71 |
| 4,502,378 | 3/1985 | Cullen | 100/65 |
| 4,567,820 | 2/1986 | Munsell | 100/65 |
| 4,621,666 | 11/1986 | Ryan | 141/114 |
| 4,653,553 | 3/1987 | Cox et al. | 100/65 X |
| 4,724,876 | 2/1988 | Ryan | 141/114 |
| 4,788,901 | 12/1988 | Klinner et al. | 100/100 X |
| 4,945,715 | 8/1990 | Brodrecht | 53/567 |
| 4,949,633 | 8/1990 | Johnson et al. | 100/65 |
| 4,951,452 | 8/1990 | Lundahl et al. | 56/341 |
| 5,113,635 | 5/1992 | Takai et al. | 53/52 |
| 5,159,877 | 11/1992 | Inman et al. | 100/144 |
| 5,269,829 | 12/1993 | Meyer | 71/9 |
| 5,295,554 | 3/1994 | Cullen | 180/236 |

*Primary Examiner*—Linda Johnson
*Attorney, Agent, or Firm*—Zarley, McKee, Thomte Voorhees & Sease; Dennis L. Thomte

[57] ABSTRACT

An agricultural bagging machine is disclosed which includes a plurality of density control bars positioned within the tunnel of the machine. The density control bars are selectively pivotally moveable to the path of the silage being compacted in the bag so that the desired density of the silage is achieved.

9 Claims, 2 Drawing Sheets

DENSITY CONTROL MEANS FOR AN AGRICULTURAL FEED BAGGING MACHINE

CROSS REFERENCE TO RELATED APPLICATION

This is a continuation application of Ser. No. 08/342,603 entitled DENSITY CONTROL MEANS FOR AN AGRICULTURAL FEED BAGGING MACHINE, filed Nov. 21, 1994, now U.S. Pat. No. 5,894,713, which is a continuation of Ser. No. 07/912,873 entitled DENSITY CONTROL MEANS FOR AN AGRICULTURAL FEED BAGGING MACHINE, filed Jul. 13,1992, now abandoned.

BACKGROUND OF THE INVENTION

Agricultural feed bagging machines have been employed for several years to pack or bag silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor which conveys the silage into a tunnel on which the bag is positioned so that the bag is filled. As silage is loaded into the bag, the bagging machine moves away from the filled end of the bag in a controlled fashion so as to achieve uniformed compaction of the silage material within the bag. In U.S. Pat. No. 4,337,805, silage is forced by means of a rotor means from the intake chamber of the machine through the output chamber of the machine and into the agricultural bag with a backstop structure yieldably engaging the closed end of the agricultural bag to resist the movement of the bagging machine away from the filled end of the agricultural bag as silage is forced into the bag. The backstop structure of the '805 patent comprising of a pair of drums rotatably mounted on the bagging machine with a brake associated therewith for braking or resisting the rotation of the drum with a selected brake force. A cable is wrapped around the drum and is connected to the backstop.

Although the cable drum-backstop structure of the '805 patent and other similar machines do function generally satisfactorily, the cables, which are positioned on opposite sides of the bag, can create openings or holes in the bag which will adversely effect the fermentation process within the bag. A further disadvantage of the cable drum-backstop structure of the devices such as shown in the '805 patent is that the cables must be rewound after the filling of an individual bag. A further disadvantage of the cable drum-backstop structure of the machine such as disposed in the '805 patent is that a dangerous condition exists should one of the cables break.

In an effort to overcome some of the disadvantages of machines such as disclosed in the '805 patent, an attempt was made in U.S. Pat. No. 4,621,666 to achieve the desired bagging operation while eliminating the need for the cable drum-backstop structure. In the '666 patent, the wheels on the bagging machine were braked to provide the desired resistance to the filling of the bag. Although the brake system of the '666 patent apparently met with some success, it is believed that machines such as disclosed in the '666 patent experience slippage difficulties in wet field conditions which adversely effect the bagging operation. It is also believed that the brake means alone on the bagging machine such as those disclosed in the '666 patent do not achieve the desired compaction of the silage material within the bag.

Further, none of the prior art devices which applicant is aware have the capability of enabling the density of the silage material to be selectively controlled without the need of elaborate breaking systems. It is therefore the principal object of the invention to provide an improved agricultural feed bagging machine.

A further object of the invention is to provide a density control means for an agricultural feed bagging machine.

Yet another object of the invention is to provide a density control means for an agricultural feed bagging machine including a plurality of spaced apart density control bars which are positioned rearwardly of the rotor of the bagging machine.

Still another object of the invention is to provide a density control means for an agricultural feed bagging machine including a plurality of spaced apart density control bars which are selectively pivotally moveable into the path of the silage material being compacted.

These and other objects of the invention will be apparent to those skilled in the art.

SUMMARY OF THE INVENTION

An agricultural feed bagging machine is disclosed which comprises a wheeled frame means having rearward and forward ends. A tunnel is provided on the wheeled frame means and has an intake end for receiving silage material and an output end which is adapted to receive the mouth of an agricultural bag. A hopper is provided on the wheeled frame means for receiving the silage material and is adapted to supply the same to a rotatable rotor which forces the silage into the tunnel means and into the bag. The density control means of this invention is positioned rearwardly of the rotor and comprises a selectively rotatable shaft which is horizontally disposed within the tunnel and which has a plurality of density control bars mounted thereon which extend downwardly therefrom. The rotatable shaft may be selectively rotated by means of a hydraulic cylinder operatively connected thereto. Operation of the hydraulic cylinder causes the density control bars to be moved into the path of the silage material being bagged so as to be able to control the density of the silage material within the bag. The wheels on the bagging machine are also provided with suitable breaks to resist the movement of the machine away from the closed end of the agricultural bag.

DESCRIPTION OF THE PREFERRED EMBODIMENT

Figure 1:
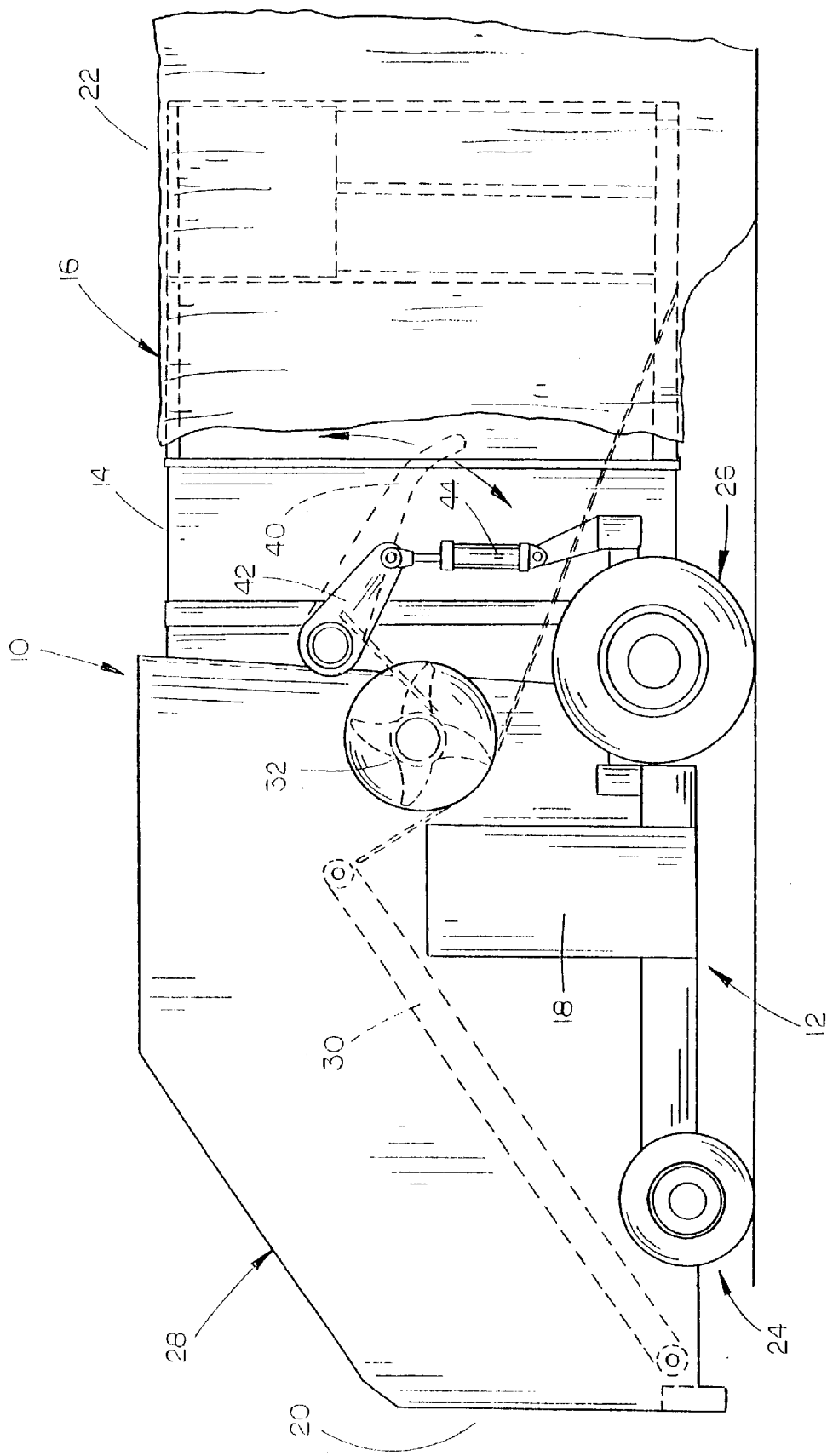
FIG. 1 is a side elevational view of the bagging machine of this invention.

The bagging machine of this invention is referred to generally by the reference numeral 10 and is of the type disclosed in my co-pending application, Ser. No. 879,789 filed May 6, 1992 which is a continuation-in-part application of Ser. No. 815,942 filed Dec. 30, 1991, the disclosures of which are relied upon to complete this disclosure. Machine 10 includes a wheeled frame means 12 having a tunnel 14 mounted thereon upon which is normally positioned the open mouth of an agricultural bag 16 as illustrated in FIG. 1. For purposes of conciseness, the power means for driving the various components of the machine have not been disclosed since the same does not form a part of the invention. However, the reference numeral 18 refers schematically to the location where the power means for the machine would be located. For purposes of description, the bagging machine 10 will be described as including a forward end 20 and a rearward end 22. Also for purposes of description, the wheeled frame means 12 of the bagging machine 10 will be described as including a pair of front wheels 24 and a pair of rear wheels 26. Preferably, the rear wheels 26 would include wheel brakes associated therewith such as disclosed in U.S. Pat. No. 4,621,666. Wheel brakes such as described in the '666 patent are operatively associated with the wheels 26 for loading the wheels to a predetermined setting to resist the movement of the bagging machine 10 away from the closed end of the bag 16 as the bag 16 is being filled.

Bagging machine 10 includes a hopper means at the forward end thereof which is adapted to receive silage material or the like from a truck, wagon, etc. The design of the hopper means 28 does not form a portion of the invention. In the embodiment seen in FIG. 1, a feed table 30 is provided for conveying the silage material upwardly and rearwardly to the rotor 32 which is located at the forward end of the tunnel 14 and which is designed to be rotated in a counterclockwise direction as viewed in FIG. 1 to force silage from the hopper means 28 into the tunnel 14 and into the bag 16. The density control means of this invention is referred to generally by the reference numeral 34. The density control means 34 includes a horizontally disposed shaft or pipe 36 which extends from one side of the tunnel 14 to the other side thereof rearwardly of the rotor 32. Shaft 36 is suitably rotatably mounted at its opposite ends to the tunnel 14 and has a plurality of spaced-apart density control bars 38 secured thereto and extending rearwardly and downwardly therefrom as illustrated in the drawings. The number of the density control bars 38 and the spacing thereof will depend upon the particular type of silage material being bagged. The density control bars 38 are flat and elongated and have downwardly curved or arcuate portions 40 at their rearward ends.

Figure 2:
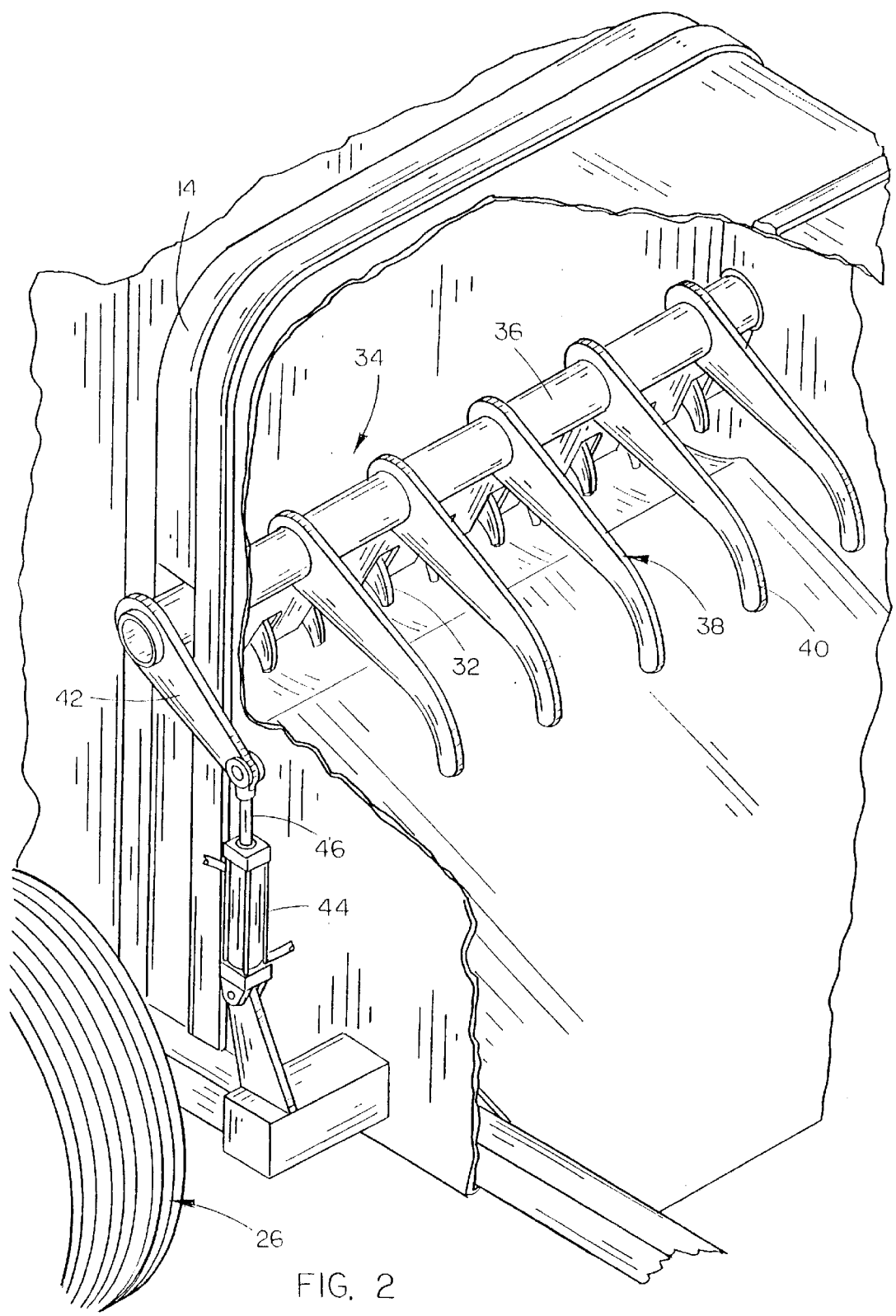
FIG. 2 is a partial rear perspective view of the machine of this invention with portions thereof cut away to more fully illustrate the invention.

Arm 42 is secured to one end of the shaft 36 outwardly of the tunnel 14 as seen in FIG. 2 and has a hydraulic cylinder 44 or their like operatively secured thereto to permit the selective rotation of the shaft means 36. Other types of actuators could be substituted for the hydraulic cylinder 44 but the cylinder 44 is the preferred embodiment. Thus, as viewed in FIG. 2, retraction of the cylinder rod 46 will cause the density control bars 38 to move downwardly to a greater degree into the flow of the silage material being fed from the rotor into the tunnel 14 and into the bag 16. It can be appreciated that greater density of the silage material within the bag will be achieved through the utilization of a larger number of density bars and vice versa. Further, greater density will be achieved in the silage material within the bag as the density bars 40 approach the vertical below shaft 36.

Thus, the density of the silage material within the bag may be controlled by the density control means 36 acting in conjunction with the braking of the wheels 26. The density control means of this invention eliminates the need for the cables of the '805 machine and results in a uniformly compacted bag having the desired density. Thus, it can be seen that the invention accomplishes at least all of the stated objectives.

I claim:

1. An agricultural bagging machine for bagging silage material into an agricultural bag having a closed end and an open mouth, a wheeled frame having rearward and forward ends, a tunnel on said wheeled frame and having an intake end for receiving silage material, an output end adapted to receive the mouth of the agricultural bag, opposing side walls and upper and lower walls, a hopper on said wheeled frame for receiving silage material, a horizontally disposed rotor, in communication with said hopper, at the intake end of said tunnel for forcing silage into and through said tunnel and into said bag, means for rotating said rotor, a brake operatively associated with said wheeled frame for resisting relative movement between the bagging machine and the closed end of the bag, and a silage density control means in said tunnel positioned rearwardly of said rotor for engagement with the silage material being forced through said tunnel by said rotor to permit the density of the silage material in the bag to be controlled, said silage density control means including a plurality of horizontally spaced-apart density bars located between said tunnel side walls and being selectively operably movable within the flow of silage material being forced rearwardly through said tunnel into the bag by said rotor, said density bars being secured to an elongated, horizontally disposed rotatable shaft positioned in said tunnel transverse to the path of the silage material, said density bars extending into the path of the silage material being forced rearwardly through said tunnel into the bag by said rotor to resist the flow of silage into said tunnel; and means operatively connected to said shaft for selectively rotating said shaft about its longitudinal axis, less than a full rotation to selectively change the angle at which the density bars contact the flow of silage to vary the resistance created by said density bars thereby selectively varying the density of the silage material in the bag.

2. The bagging machine of claim 1 wherein said means for selectively rotating said shaft comprises a power cylinder means operatively connected to said shaft.

3. The bagging machine of claim 1 wherein each of said density bars comprises an elongated member having upper and lower ends, said lower end of each of said bars being arcuate.

4. The bagging machine of claim 1 wherein each of said density bars comprises a flat, elongated member having an upper end secured to said shaft, said elongated member extending rearwardly and downwardly from its upper end.

5. The bagging machine of claim 1 wherein said density bars are positioned across the entire intake end of said tunnel.

6. The bagging machine of claim 1 wherein said brake comprises wheel brakes for resisting relative movement between the bagging machine and the closed end of the bag.

7. The method of bagging silage material into agricultural bags having a closed end and an open mouth, comprising the steps of:

providing a bagging machine including a wheeled frame having a rearward end and a forward end, a tunnel on said wheeled frame and having an intake end for receiving the silage material, an output end adapted to receive the mouth of the agricultural bag, opposing side walls and upper and lower walls, a hopper on said wheeled frame for receiving the silage material, a horizontally disposed rotor, in communication with said hopper, at the intake end of said tunnel for forcing the silage material into and through said tunnel and into said bag, means for rotating said rotor, brake means operatively associated with said wheeled frame for resisting relative movement between the bagging machine and the closed end of the bag, and a silage density control means in said tunnel positioned rearwardly of said rotor for engagement with the silage material being forced through said tunnel by said rotor to permit the density of the silage material in the bag to be controlled, said silage density control means including a plurality of horizontally spaced-apart density bars selectively operably movable within the flow of silage material being forced rearwardly through said tunnel into the bag by said rotor, said density bars being secured to an elongated, horizontally disposed rotatable shaft positioned in said tunnel transverse to the path of the silage material;

placing silage material into said hopper;

operating said rotor to force the silage material into and through said tunnel and into said bag;

and controlling the density of the silage material placed into said bag by causing a portion of the silage material passing through said tunnel to move into engagement with and to pass between said plurality of density control bars.

8. The method of claim 7 wherein the density of the silage material within the bag is selectively varied by changing the spacing between said density control bars.

9. The method of claim 7 wherein the density of the silage material within the bag is selectively varied by changing the angular relationship, with respect to vertical, of the density control bars.

* * * * *